Patented Mar. 7, 1939

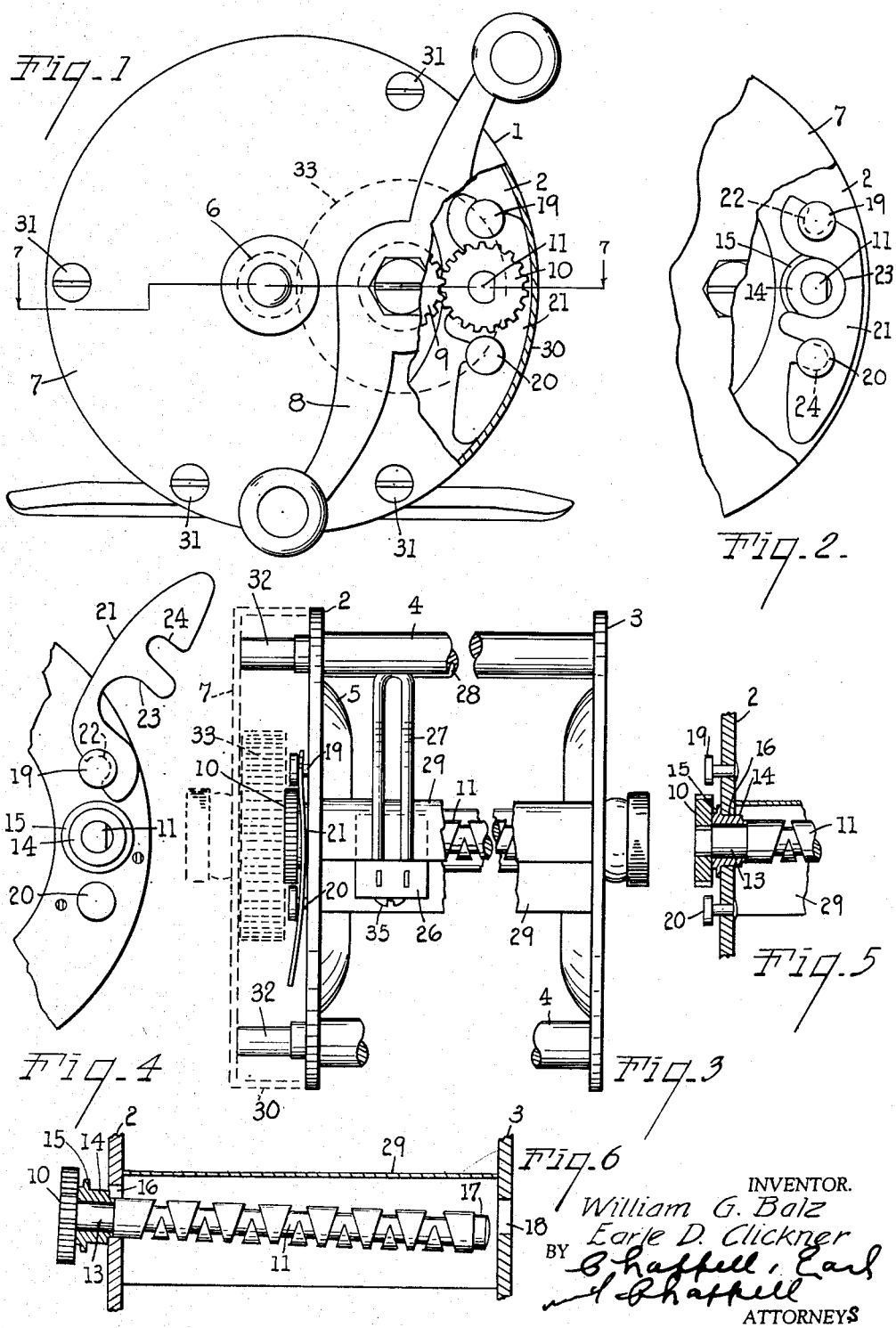

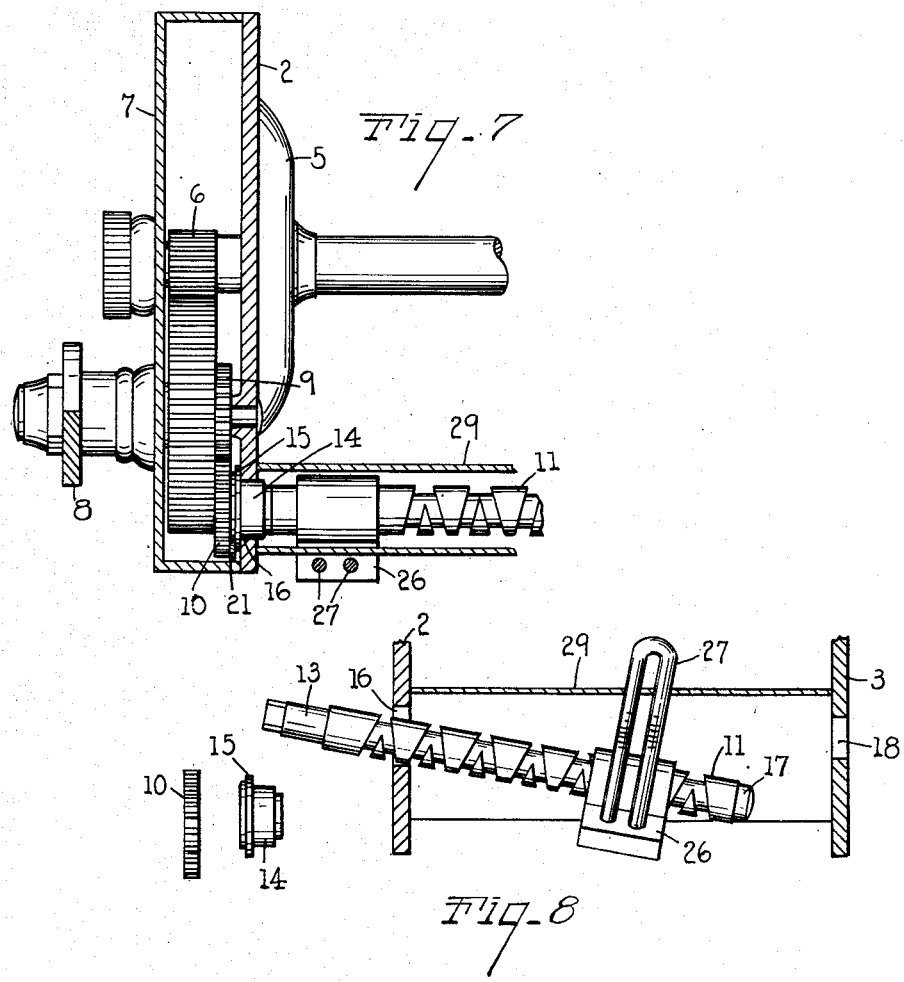

2,149,413

UNITED STATES PATENT OFFICE 2,149,413

FISHING REEL

William G. Balz and Earle D. Clickner, Kalamazoo, Mich., assignors to Shakespeare Company, Kalamazoo, Mich.

Application October 21, 1935, Serial No. 45,945

15 Claims. (Cl. 242—84.4)

This invention relates to improvements in fishing reels.

The main objects of our invention are:

First, to provide an improved fishing reel of the level wind type in which the level wind mechanism may be readily removed from the frame for cleaning or renewal.

Second, to provide a reel structure having these advantages in which the parts are very simple in design and economical to manufacture, as well as being readily assembled and disassembled for the purposes above indicated without the aid of special tools or the necessity for particular mechanical skill.

Objects pertaining to details and economies of our invention will definitely appear from the description to follow. The invention is defined in the claims.

A structure embodying the features of our invention is clearly illustrated in the accompanying drawings, in which:

Fig. 1 is an end elevation of a fishing reel embodying the features of our invention, parts being broken away and sectioned to disclose normally enclosed parts.

Fig. 2 is a fragmentary end elevation similar to that of Fig. 1 with additional parts removed to further show the relation of parts.

Fig. 3 is a fragmentary side view with the removable head plate shown by dotted lines.

Fig. 4 is a fragmentary view with the traversing shaft assembly clip in shaft releasing position.

Fig. 5 is a fragmentary view partially in longitudinal section, showing the traversing shaft assembly retaining clip disengaged.

Fig. 6 is a fragmentary view partially in longitudinal section, showing the traversing shaft assembly partially removed.

Fig. 7 is an enlarged fragmentary sectional view taken along the line 7—7 of Fig. 1, illustrating the relation of the parts.

Fig. 8 is a fragmentary view similar to Fig. 6, illustrating an alternative method of removing the traversing shaft.

In the embodiment of our invention illustrated in the accompanying drawings, the reference numeral 1 indicates a fishing reel of the type comprising a frame consisting of head and tail members 2 and 3 connected in spaced relation by the pillars 4. The spool 5 is journaled in the frame and is provided with a pinion indicated at 6, Fig. 1.

The head or housing plate 7 is provided with a peripheral flange 30 which abuts the end member 2 and is detachably secured in position by the screws 31 tapped into the reduced ends 32 of the frame pillars. The gear 33 is mounted on the shaft of the crank 8 and coacts with the spool pinion 6. The shaft of the crank 8 also has a pinion 9 thereon meshing with the traversing shaft pinion 10. This traversing shaft pinion 10 is mounted, that is, assembled, on the D-shaped tenon of the threaded traversing shaft 11.

The shaft 11 has a reduced portion 13 at its pinion end receiving the bearing 14. This bearing 14 has an annular flange 15 spaced from its outer end, this flange seating against the frame end member 2 when the bearing is inserted in the bearing opening 16 provided therefor in the end member, see Figs. 5 and 6. At its opposite end, the traversing shaft 11 has a journal 17 engaging a bearing 18 in the tail end member. It will be observed that the traversing shaft, the bearing 14 and the pinion 10 may be assembled as a unit and that they may be removed from or introduced into the frame by a longitudinal movement.

To detachably retain the traversing shaft in the frame, the head end member 2 is provided with a pair of headed studs or lugs 19 and 20 disposed on opposite sides of the bearing. We provide a spring retaining clip 21 which is notched or recessed at 22 and 24 to engage the lugs 19 and 20 respectively and has a further recess 23 to receive the bearing 14 at the outside of the flange thereon. This spring clip is bowed so that when engaged with the lugs an end thrust is imparted on the bearing urging it and also the shaft assembled therewith endwise into seated or assembled position.

The traversing carriage 26 is provided with a suitable pawl, this not being illustrated as the structure may be of well known type. The pawl is removably retained by means of the screw 35 so that when it is desired to disassemble the shaft and carriage, the pawl is removed, which allows the shaft to be slipped out of the carriage.

The line guide eye 27 on the carriage preferably engages a groove 28 in one of the pillars, thus preventing rotative movement of the carriage. The housing 29 is mounted between the frame end members.

When the clip is in engaged position as shown in Figs. 1 and 2, the housing or head plate may be positioned and secured as described, the flange of the head plate in this position embracing the clip and retaining the traversing shaft parts in assembled relation. However, when the head or housing plate is removed, the clip is accessible so that it may be swung to disengaging or inoperative position, which frees the traversing shaft assembly so that it may be readily removed for cleaning or replacement, and this without the use of tools other than a screw driver, coin or the like for removing the head plate.

Alternatively, the traversing shaft may be removed from the head and tail members without the necessity of sliding carriage 26 off the shaft or withdrawing the shaft from the carriage, by simply sliding pinion 10 off the D-shaped tenon of traversing shaft 11 and thereafter removing bearing 14, which allows the traversing shaft and carriage to be tilted and manipulated as is illustrated in Fig. 8.

It will be noted that the parts are exceedingly simple in structure and assembly and the advantages to the user of assembling are also incident in the manufacture.

We have illustrated and described our improvements in an embodiment which we have found very practical. We have not attempted to illustrate or describe certain modifications and adaptations which we contemplate as we believe this disclosure will enable those skilled in the art to embody or adapt our improvements as may be desired.

Having thus described our invention, what we claim as new and desire to secure by Letters Patent, is:

1. In a fishing reel, the combination with a frame comprising head and tail end members, a removable flanged head plate, the head end member having a bearing opening therein, the tail end member having an alined traversing shaft bearing, a reversely threaded traversing shaft having a pinion and a bearing assembled therewith, the bearing being removably engageable with said bearing opening in said head end member and being located at the inside of the pinion, said bearing having an annular flange spaced from said pinion and seating against the head end member when the traversing shaft is assembled in the frame, a pair of headed studs on said head end member disposed on opposite sides of said bearing, a spring clip recessed to receive said bearing at the outside of its said flange and having notches engageable with said headed studs, the clip being bowed so that when in engagement with the studs and the bearing it acts to retain the traversing shaft, the flange of said head plate acting as a retaining member for said clip so that when the head plate is removed the clip may be disengaged to permit removal of the traversing shaft, a housing for said traversing shaft mounted on said frame end members, and a line guide carriage with which said traversing shaft may be engaged and disengaged.

2. In a fishing reel, the combination with a frame comprising head and tail end members, a removable flanged head plate, the head end member having a bearing opening therein, the tail end member having an alined traversing shaft bearing, a reversely threaded traversing shaft having a pinion and a bearing assembled therewith, the bearing being removably engageable with said bearing opening in said head end member and being located at the inside of the pinion, said bearing having an annular flange spaced from said pinion and seating against the head end member when the traversing shaft is assembled in the frame, a pair of headed studs on said head end member disposed on opposite sides of said bearing, and a spring clip recessed to receive said bearing at the outside of its said flange and having notches engageable with said headed studs, the clip being bowed so that when in engagement with the studs and the bearing it acts to retain the traversing shaft, the flange of said head plate acting as a retaining member for said clip so that when the head plate is removed the clip may be disengaged to permit removal of the traversing shaft.

3. In a fishing reel, the combination with a frame comprising head and tail end members, a removable housing member, the head end member having a bearing opening therein, the tail end member having an alined traversing shaft bearing, a reversely threaded traversing shaft having a pinion and a bearing assembled therewith, the bearing being removably engageable with said bearing opening in said head end member and being located at the inside of the pinion, said bearing having an annular flange spaced from said pinion and seating against the head end member when the traversing shaft is assembled in the frame, studs on said head end member, a clip detachably engageable with said studs and recessed to receive said bearing at the outside of its said flange, the housing member acting as a restraining member for said clip so that when the housing member is removed the clip may be disengaged to permit removal of the traversing shaft, a housing for said traversing shaft mounted on said frame end members, and a line guide carriage with which said traversing shaft may be engaged and disengaged.

4. In a fishing reel, the combination with a frame comprising head and tail end members, a removable housing member, the head end member having a bearing opening therein, the tail end member having an alined traversing shaft bearing, a reversely threaded traversing shaft having a pinion and a bearing assembled therewith, the bearing being removably engageable with said bearing opening in said head end member and being located at the inside of the pinion, said bearing having an annular flange spaced from said pinion and seating against the head end member when the traversing shaft is assembled in the frame, studs on said head end member, and a clip detachably engageable with said studs and recessed to receive said bearing at the outside of its said flange, the housing member acting as a retaining member for said clip so that when the housing member is removed the clip may be disengaged to permit removal of the traversing shaft.

5. In a fishing reel, the combination with a frame comprising head and tail end members, the head end member having a bearing opening therein, the tail end member having an alined traversing shaft bearing, a reversely threaded traversing shaft having a pinion and a bearing assembled therewith, the bearing being removably engageable with said bearing opening in said head end member and being located at the inside of the pinion, said bearing having an annular flange spaced from said pinion and seating against the head end member when the traversing shaft is assembled in the frame, studs on said head end member, and a clip detachably engageable with said studs and recessed to receive said bearing at the outside of its said flange.

6. In a fishing reel, the combination with a frame comprising end members provided with alined bearings, one of said bearings being removable, a traversing shaft having a pinion and said removable bearing associated therewith, a removable gear housing, and a spring clip detachably engageable with the frame and with said removable bearing and acting when engaged to retain the traversing shaft and the bearing in operative position in the frame, said removable gear housing acting to retain said clip in its engaged position.

7. In a fishing reel, the combination with a frame comprising end members provided with alined bearings, one of said bearings being removable, a traversing shaft having a pinion and said removable bearing associated therewith, and a spring clip detachably engageable with the frame and with said removable bearing and acting when engaged to retain the traversing shaft and the bearing in operative position in the frame.

8. In a fishing reel, the combination with a frame comprising end members provided with alined bearings, one of said bearings being removable, a traversing shaft having a pinion and said removable bearing associated therewith, and pivotally mounted means engageable with said removable bearing for retaining said shaft assembly in operative position in the frame, and manually actuated to enable the assembly to be removed.

9. In a fishing reel, the combination with a frame comprising end members, a traversing shaft removably mounted in said end members and engageable and disengageable therewith by a longitudinal movement of the shaft, said shaft having a bearing and a pinion assembled therewith to be inserted into and removed from the frame as a unit, and pivoted spring means for retaining said assembly in said frame.

10. In a fishing reel, the combination with a frame comprising head and tail end members, a removable gear driven line guide traversing shaft, means mounting said shaft in said head member, said shaft being journaled at its other end in said tail member, removable means for retaining said shaft in mounted position comprising headed projecting lugs and a clip, gears adjacent the head member for driving said shaft, and a removable head plate enclosing said gears and retaining means.

11. In a fishing reel, the combination with a frame comprising head and tail end members, a removable line guide traversing shaft, means mounting said shaft in said head member, said shaft being journaled at its other end in said tail member, removable means for retaining said shaft in mounted position comprising headed projecting lugs and a clip, and a removable plate enclosing said retaining means.

12. In a fishing reel, the combination with a frame comprising head and tail end members, a removable line guide traversing shaft, means mounting said shaft in said head member, said shaft being journaled at its other end in said tail member, and pivoted removable means for retaining said shaft and mounting means therefor in mounted position, said pivoted means comprising a spring element whereby the shaft and mounting means are resiliently urged to mounted position.

13. In a fishing reel, the combination with a frame comprising head and tail end members, the head member having a bearing opening therein, the tail member having an alined traversing shaft bearing, of a traversing shaft having a pinion and bearing removably assembled therewith, the bearing being removably engageable with said bearing opening in said head member and having an annular flange spaced from said pinion and seating against the head member, studs on said head end member, a clip detachably engageable with said studs and recessed to receive said bearing between said pinion and said flange, and a line guide carriage slidable on said traversing shaft, said shaft being removable from said reel without removing said carriage from the shaft.

14. In a fishing reel, the combination with a frame comprising head and tail end members, the head member having a bearing opening therein, the tail member having an alined traversing shaft bearing, of a traversing shaft having a pinion and bearing removably assembled therewith, the bearing being removably engageable with said bearing opening in said head member and having an annular flange spaced from said pinion and seating against the head member, studs on said head end member, means detachably engageable with said studs and operative to seat said bearing flange against said head member, and a line guide carriage slidable on said traversing shaft, said shaft being removable from said reel without removing said carriage from the shaft.

15. In a reel, the combination with a frame comprising end members provided with aligned bearings, one of said bearings being removable from the outer side of the end member and having a flange spaced from its outer end, a traversing shaft shouldered to receive said removable bearing and having a pinion thereon on the outer side of the bearing, and a spring clip member mounted on said end member and engageable with said bearing at the outer side of its said flange and acting to retain said bearing and yieldably urge the parts to mounted position.

WILLIAM G. BALZ.
EARLE D. CLICKNER.